2 Sheets—Sheet 1.

W. E. KELLEY.
Seed-Planter.

No. 217,113. Patented July 1, 1879.

Attest:

Sophie E. Kelley
Hattie A. Lincoln

Inventor:

William E. Kelley.

W. E. KELLEY.
Seed-Planter.

No. 217,113. Patented July 1, 1879.

Attest:
Sophie E. Kelley
Hattie A. Lincoln

Inventor:
William E. Kelley

UNITED STATES PATENT OFFICE.

WILLIAM E. KELLEY, OF COLDWATER, MICHIGAN.

IMPROVEMENT IN SEED-PLANTERS.

Specification forming part of Letters Patent No. 217,113, dated July 1, 1879; application filed September 13, 1878.

*To all whom it may concern:*

Be it known that I, WILLIAM E. KELLEY, of Coldwater, in the county of Branch and State of Michigan, have invented a new and useful improvement to be used in connection with potato-planters, cotton-seed drills, cotton-scrapers, cotton-cultivators, and other machines, of which the following is a specification.

Figure 1:
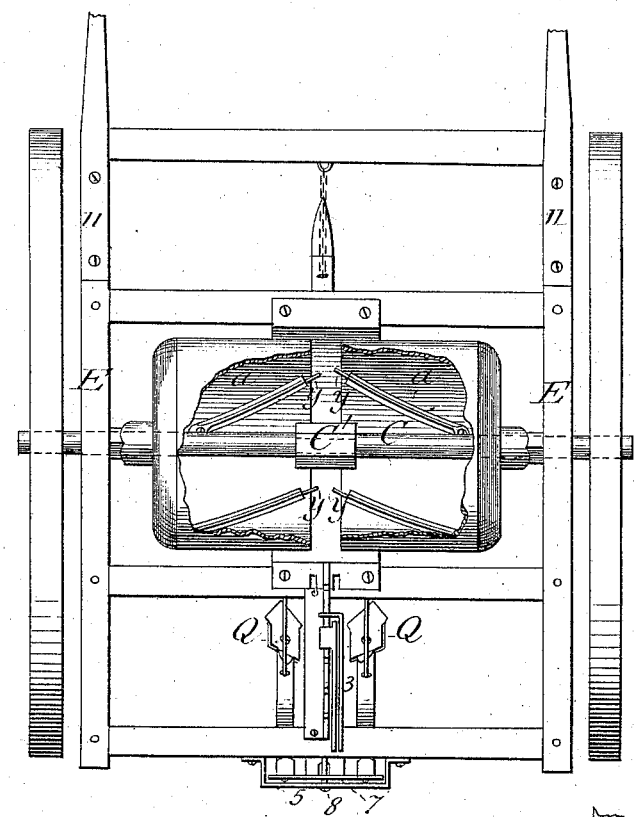
Figure 2:
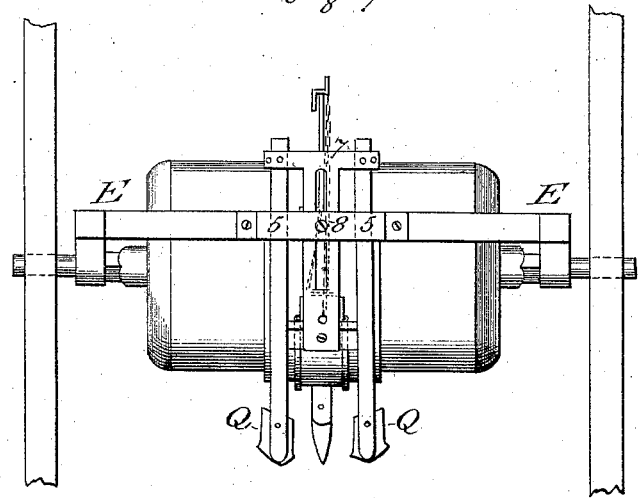
Figure 3:
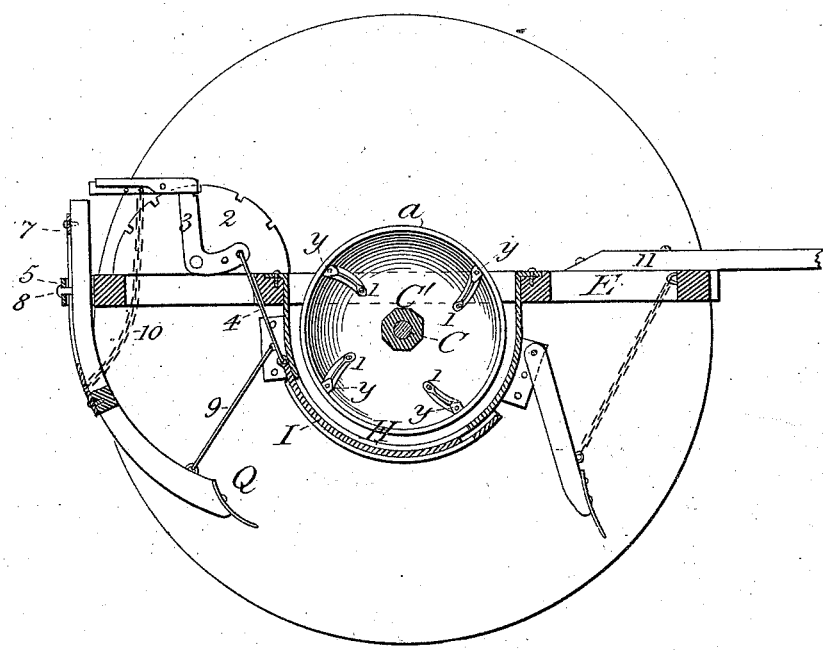
Figure 4:
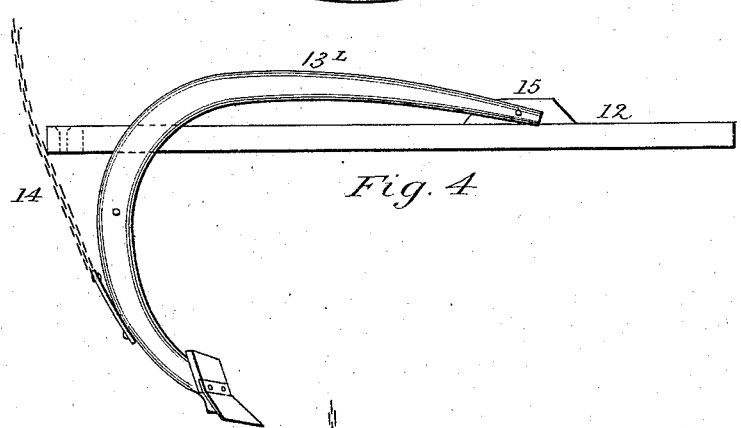
Figure 5:
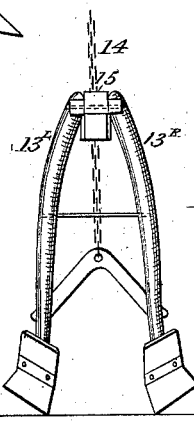

Figure 1 is a top view with a portion of the seed tubes or boxes broken away. Fig. 2 is a rear view. Fig. 3 is a longitudinal sectional view. Figs. 4 and 5 are detail views.

My invention is an improvement on the cotton-seed drill patented June 11, 1878, No. 204,671.

The shaft or axle C is made in two pieces, instead of one, as in the patent, joined at or near the center by journals resting in a self-supporting box or bearing (marked C'.) By means of said box or bearing in the center of the shaft or axle each drive-wheel and seed box or tub revolves independent of the other.

In the ends of the elevators 1 1 1, I place spring-wire spurs $y$ $y$ $y$, so arranged as to pass over the aperture H of the receiver, for the purpose of removing any malted portions of seed that may obstruct the free passage of seed through the aperture H.

The frame E is extended in front and rear, so as to admit of two cross-bars in front and two in the rear of the receiver, which consists of two seed-tubes, $a$ $a$. On the rear cross-bars is placed the semicircular ratchet 2, with lever and spring-catch 3, to which is attached by the connecting-rod 4 the stop or regulator I. By raising and lowering the lever 3 the aperture H is opened and closed, thereby dispensing with upper extension of the regulator I and catch L of the patent.

The coverers Q Q are placed on legs long enough to reach above the frame E, and are secured in the rest 5. The rest 5 may be shifted to either the front or rear of the rear cross-bar, as required, to change the inclination of the coverers to the ground, and secured by the bolts.

The standards or legs of the coverers Q Q are fastened together by the T-shaped iron 7, slotted so as to slide up and down on the bolt 8.

The lower ends of the coverers are attached to the receiver by the jointed rods 9 9, and by the chain 10 they are also fastened to the lever 3, so that by the shifting of the lever to open and close the aperture H the coverers are raised and lowered to and from the ground.

The thills are made so as to be detached from the frame E at 11 11, being secured by bolts and clips.

The tongue 12, with right and left hand plows or scrapers $13^R$ $13^L$, is placed in the center of the frame E after the seed boxes or tubs and receiver and coverers are removed.

The plows or scrapers $13^R$ and $13^L$ are so arranged that they may be reversed or transposed from one side of the tongue to the other, and used in throwing the dirt away from or up to the cotton, as required. The plows or scrapers are attached to the lever 3 by the chain 14. By shifting the lever up or down they are raised or lowered to and from the ground.

The forward ends of the beams are attached to the block 15 on the top of the tongue. The block may be changed from either top to the bottom, or vice versa, and moved back or forward on the tongue, thereby regulating the depth of the plows in the ground to suit the convenience of the operator.

What I claim is—

1. The jointed shaft or axle C and the self-supporting box or bearing C', placed in center of the shaft, allowing an independent movement of each tub or seed-box and drive-wheel, facilitating the movement of the machine in turning.

2. The spurs $y$ $y$ $y$ in the ends of the elevators 1 1 1, for the purpose of removing any obstructions to the aperture H.

WILLIAM E. KELLEY.

Witnesses:
SOPHIE E. KELLEY,
HATTIE A. LINCOLN.